United States Patent
Chung et al.

(10) Patent No.: US 10,948,673 B2
(45) Date of Patent: Mar. 16, 2021

(54) WIRED OPTICAL COMMUNICATION ASSEMBLY HAVING FIRST AND SECOND ARRAYED WAVEGUIDE GRATINGS DISPOSED SUBSTANTIALLY PARALLEL WITH EACH OTHER

(71) Applicant: Prime World International Holdings Ltd., New Taipei (TW)

(72) Inventors: Ming-Hsing Chung, New Taipei (TW); Ting-Jhang Liao, New Taipei (TW); Ming-You Lai, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/779,964

(22) Filed: Feb. 3, 2020

(65) Prior Publication Data

US 2020/0174208 A1   Jun. 4, 2020

Related U.S. Application Data

(62) Division of application No. 15/991,142, filed on May 29, 2018, now Pat. No. 10,551,584.

(30) Foreign Application Priority Data

Jan. 26, 2018   (TW) ............................. 107102809

(51) Int. Cl.
*G02B 6/44* (2006.01)
*G02B 6/12* (2006.01)
(Continued)

(52) U.S. Cl.
CPC ....... *G02B 6/4401* (2013.01); *G02B 6/12009* (2013.01); *G02B 6/4215* (2013.01);
(Continued)

(58) Field of Classification Search
CPC ........................... G02B 6/4401; G02B 6/4415
See application file for complete search history.

(56) References Cited

U.S. PATENT DOCUMENTS

| 4,859,020 A | 8/1989 | Deusser et al. |
| 5,444,804 A * | 8/1995 | Yui .......................... G02B 6/30 |
| | | 385/49 |

(Continued)

FOREIGN PATENT DOCUMENTS

CN   205280994 U   6/2016

*Primary Examiner* — Daniel Petkovsek
(74) *Attorney, Agent, or Firm* — Grossman Tucker Perreault & Pfleger, PLLC

(57) ABSTRACT

Generally disclosed herein is an optical cable assembly a casing that defines a storage space, the casing having a first through hole at a first end and a second through hole at the second end, a first arrayed waveguide grating (AWG) disposed in the storage space, a second AWG disposed in the storage space, a first optical cable comprising at least one transmission optical fiber connected to a first end of the first and second AWGs, a second optical cable comprising at least one transmission optical fiber connected to a second end of the first and second AWGs, wherein the first and second AWGs are disposed substantially parallel with each other and substantially parallel with a longitudinal axis of the casing such that each of the first and second AWGs have a first end proximate the first through hole and a second end proximate the second through hole.

6 Claims, 4 Drawing Sheets

(51) Int. Cl.
*G02B 6/42* (2006.01)
*H04B 10/80* (2013.01)

(52) U.S. Cl.
CPC ............ *G02B 6/4415* (2013.01); *G02B 6/421* (2013.01); *G02B 6/4249* (2013.01); *H04B 10/801* (2013.01)

(56) References Cited

U.S. PATENT DOCUMENTS

| | | |
|---|---|---|
| 7,234,874 B2 | 6/2007 | Morse |
| 10,551,584 B2 * | 2/2020 | Chung ............ H04B 10/25891 |
| 2001/0041025 A1 * | 11/2001 | Farahi ..................... G02B 6/42 |
| | | 385/14 |
| 2002/0154847 A1 * | 10/2002 | Dutt .................. G02B 6/12021 |
| | | 385/14 |
| 2008/0175553 A1 | 7/2008 | Hendrickson et al. |
| 2017/0052316 A1 * | 2/2017 | Kwon .................. G02B 6/4215 |
| 2017/0195079 A1 * | 7/2017 | Zheng ................. H04B 10/506 |

* cited by examiner

WIRED OPTICAL COMMUNICATION ASSEMBLY HAVING FIRST AND SECOND ARRAYED WAVEGUIDE GRATINGS DISPOSED SUBSTANTIALLY PARALLEL WITH EACH OTHER

CROSS-REFERENCE TO RELATED APPLICATIONS

This application is a divisional of co-pending U.S. patent application Ser. No. 15/991,142 filed on May 29, 2018, which claims priority under 35 U.S.C. § 119(a) to Patent Application No. 107102809 filed in Taiwan, R.O.C. on Jan. 26, 2018, the entire contents of each are hereby incorporated by reference.

TECHNICAL FIELD

The disclosure relates to a wired optical communication assembly, more particularly to a wired optical communication assembly with optical waveguides disposed in cables.

BACKGROUND

Nowadays, lots of countries around the world have widely used techniques of optical fibers as main transmission tools in network systems. Since optical fiber transmissions are implemented based on total reflection of light, optical fibers have the characteristics of high-speed transmission and low transmission loss. When optical fibers are used as the transmission medium in a network system, the optical fibers have the characteristics of wide bandwidth, high-capacity and high-speed.

Currently, due to the increasing amount of data transmission and user demands for high-speed internet transmission, the amount of data transmission provided by optical fibers is insufficient. In order to overcome the problem of insufficient amount for data transmission, both receipt and transmission at two opposite ends of optical fibers become quite important in addition to the improvement of transmission speed of optical fibers. In general, transceiver optical subassemblies located at two ends of an optical fiber are usually equipped with a wavelength division multiplexer or a wavelength division de-multiplexer. The wavelength division multiplexer is capable of simultaneously transmitting a plurality of optical signals having wavelengths different from one another by coupling the plurality of optical signals into a single optical fiber, so as to increase the flow of data transmission in the optical communications network. The wavelength division de-multiplexer, meanwhile, is capable of integrating a set of signals, including a plurality of optical signals having wavelengths different from one another into a plurality of optical signals each having a specific wavelength, and further couples each of the plurality of optical signals into a specific optical channel.

Conventionally, a wavelength division multiplexer or a wavelength division de-multiplexer is disposed in a housing of an optical communication sub-assembly. However, with the trend of miniaturization of various electronic devices, the optical communication sub-assembly is also required to be downsized. Since it is necessary for the optical fibers to be disposed in a much limited space so as to be routed to the input terminal and the output terminal of the wavelength division multiplexer or the wavelength division de-multiplexer, the likelihood for the optical fibers to be damaged during the assembling process increases and bent portions of the optical fibers would lead to loss of optical signal transmission power. Therefore, how to maintain miniaturization of the optical communication sub-assembly and improve the routing of the optical fiber at the same time has become one of the issues to be addressed.

SUMMARY

According to one embodiment of the present disclosure, a wired optical communication assembly is disclosed. The wired optical communication assembly includes an optical transmission connector and a cable assembly. The cable assembly includes a casing, at least one optical waveguide, a first cable and a second cable. The casing has a storage space, a first through hole and a second through hole. The first through hole and the second through hole are located at two sides of the casing. The optical waveguide is disposed in the storage space and has a first end and a second end. The first cable has two ends, with one end thereof connected to the optical transmission connector, and the other end thereof penetrating through the first through hole of the casing and connecting to the first end of the optical waveguide. The second cable has two ends, with one end thereof penetrating through the second through hole of the casing and connecting to the second end of the optical waveguide, and the other end thereof configured to be coupled to another optical communication module.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
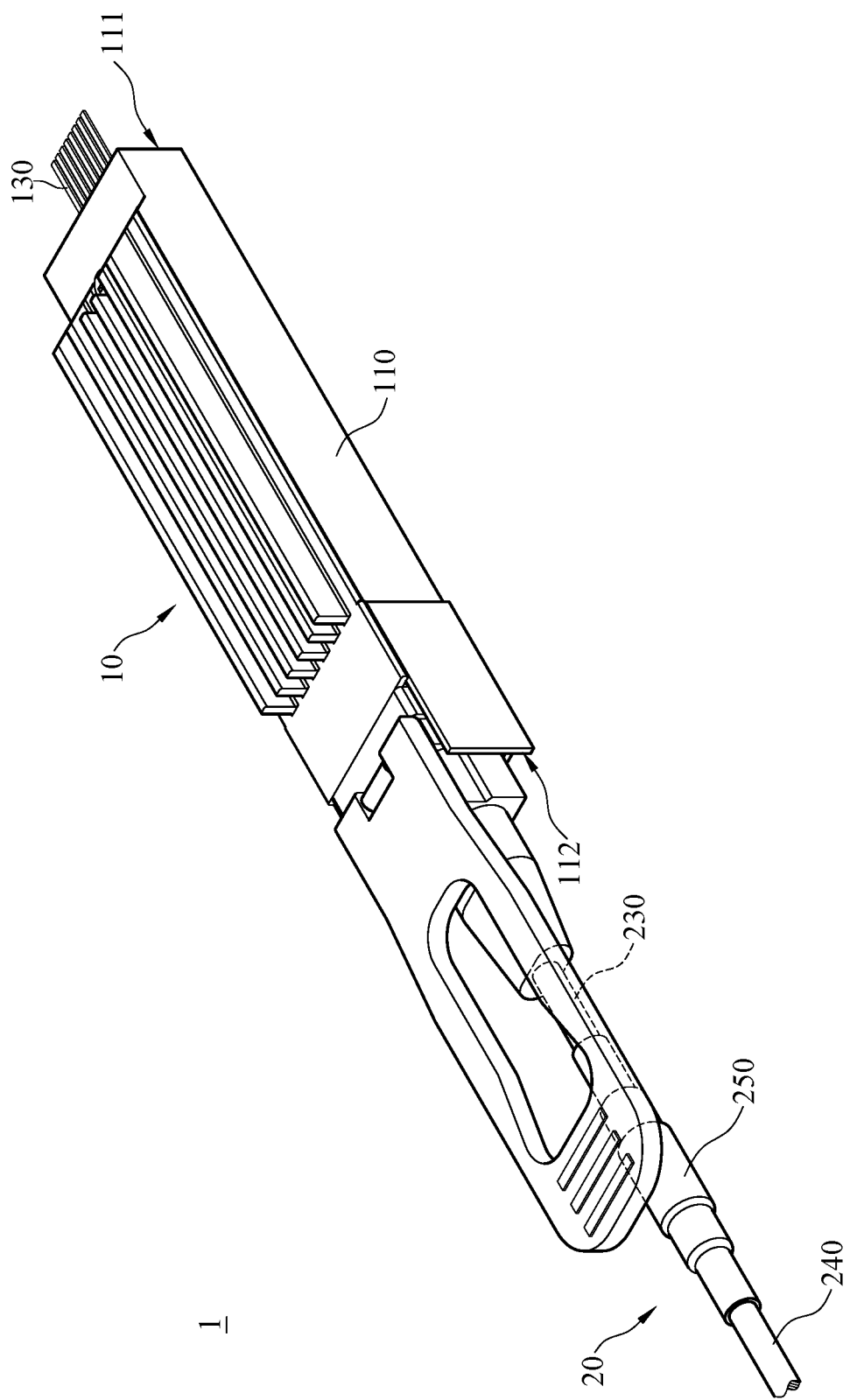
FIG. 1 is a schematic perspective view of a wired optical communication assembly according to one embodiment of the present disclosure.
Figure 2:
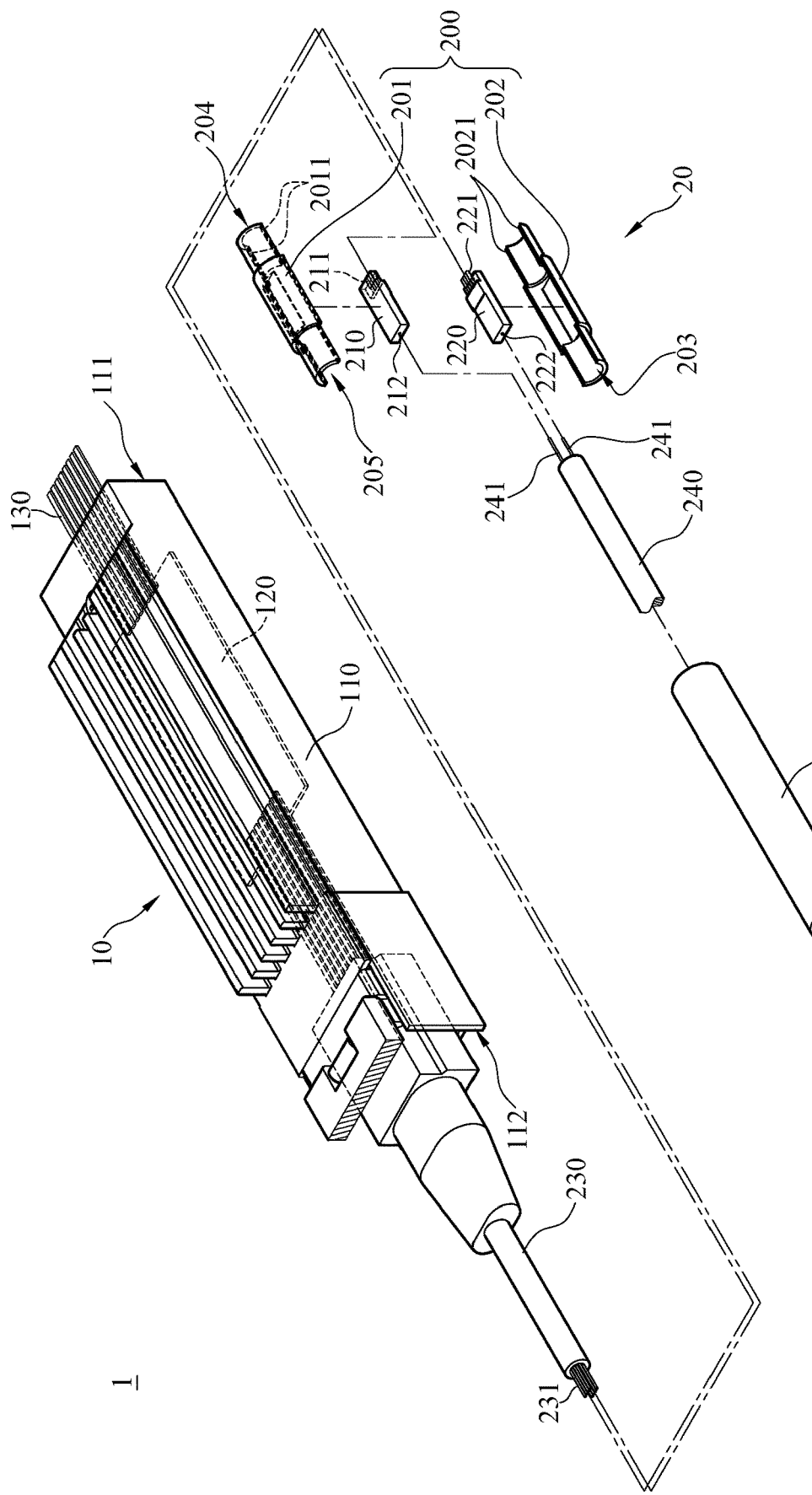
FIG. 2 is an exploded perspective view of the wired optical communication assembly shown in FIG. 1.
Figure 3:
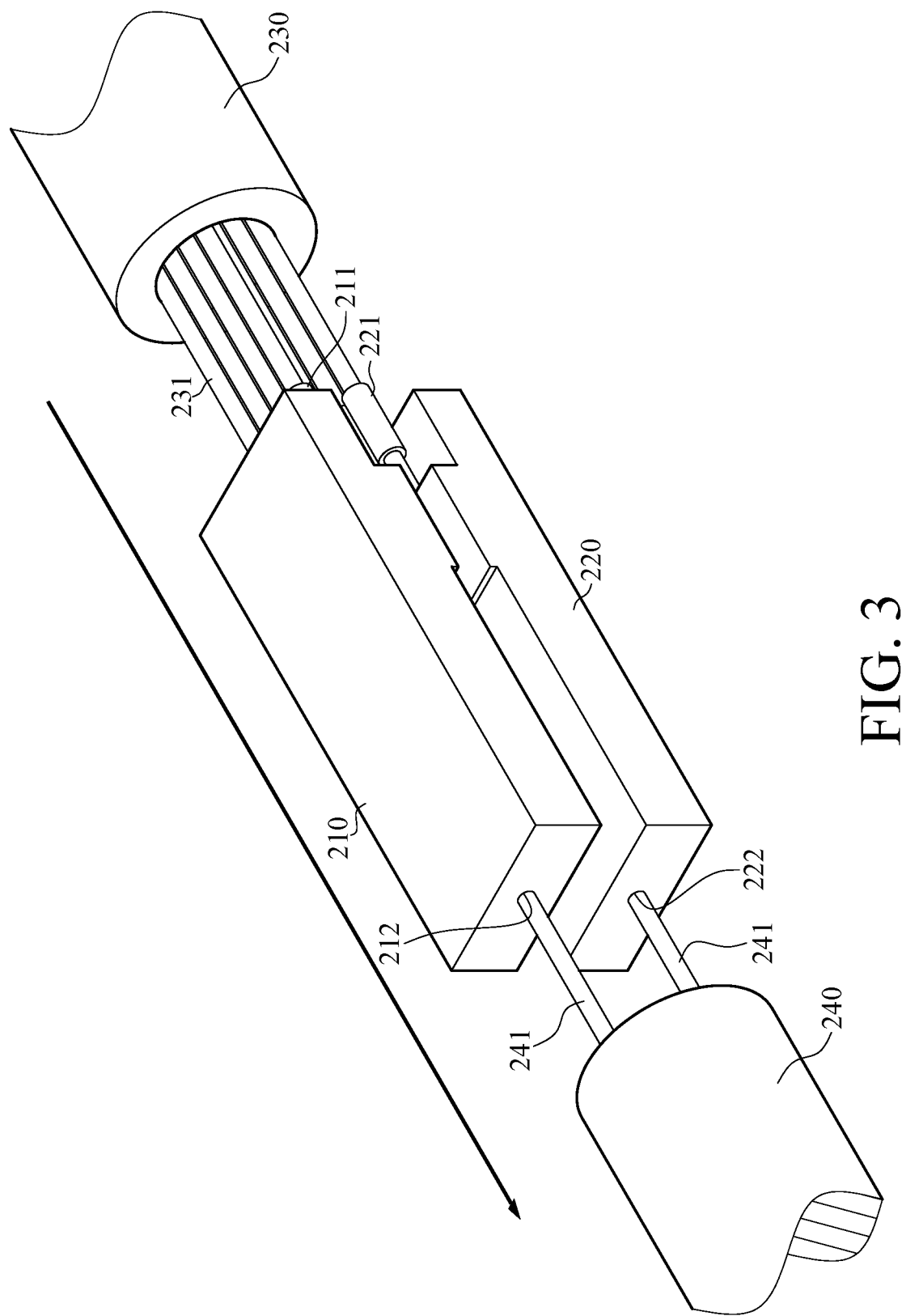
FIG. 3 is a diagram showing a direction in which the optical waveguide of FIG. 1 transmits optical signals.

Please refer to FIG. 1 to FIG. 3. FIG. 1 is a schematic perspective view of a wired optical communication assembly according to one embodiment of the present disclosure. FIG. 2 is an exploded perspective view of the wired optical communication assembly shown in FIG. 1. FIG. 3 is a diagram showing a direction in which the optical waveguide of FIG. 1 transmits optical signals.

In the embodiment, a wired optical communication assembly 1 includes an optical communication connector 10 and a cable assembly 20.

The optical communication connector 10 includes a housing 110, a circuit board 120 and a plurality of transmission terminals 130. The housing 110 has a first side 111 and a second side 112 opposite to the first side 111. The circuit board 120 is disposed in the housing 110. The plurality of transmission terminals 130 are electrically connected to the circuit board 120. The plurality of transmission terminals 130 extend toward the first side 111 and further extends out of the housing 110.

The cable assembly 20 includes a casing 200, a first optical waveguide 210, a second optical waveguide 220, a first cable 230, a second cable 240 and a casing pipe 250.

The casing 200 includes an upper cover 201 and a lower cover 202. In one implementation, the upper cover 201 has two first positioning parts 2011 in form of ridges, and the lower cover 202 has two second positioning parts 2021 in form of grooves. The first positioning parts 2011 and the second positioning parts 2021 are coupled with each other so that the upper cover 201 and the lower cover 202 could define a storage space 203 as well as a first through hole 204 and a second through hole 205 located at two opposite sides of the casing 200. The first through hole 204 and the second through hole 205 are respectively communicated with the storage space 203.

In the embodiment, when the upper cover 201 and the lower cover 202 are coupled with each other, adhesive can be applied between the first positioning parts 2011 and the second positioning parts 2021 so as to strengthen the coupling between the first positioning parts 2011 and the second positioning parts 2021. The first positioning parts 2011 and the second positioning parts 2021 could be further in form of protrusion and depression structures in other implementations such as a pin and a round hole so long as the coupling between the first positioning parts 2011 and the second positioning parts 2021 could be realized. In other words, for example, the first positioning parts 2011 could be grooves while the second positioning parts 2021 could be ridges.

Both of the first optical waveguide 210 and the second optical waveguide 220 are disposed in the storage space 203. The first optical waveguide 210 has a first end 211 and a second end 212, and the second optical waveguide 220 has a first end 221 and a second end 222. The first ends 211 and 221 and the second ends 212 and 222 are where optical signals are received and transmitted. In this embodiment, the first optical waveguide 210 is fixed to the upper cover 201 and the second optical waveguide 220 is fixed to the lower cover 202.

The first optical waveguide 210 may overlap with the second optical waveguide 220 horizontally without interfering with the same structurally. Moreover, for example, the optical waveguide is an arrayed waveguide grating (AWG) or a free space diffraction grating (FSDG).

The first cable 230 may include one or more first transmission optical fibers 231. One end of the first cable 230 is plugged into the housing 110 through the second side 112 of the housing 110 of the optical communication connector 10, and accordingly the first transmission optical fiber 231 is electrically to the circuit board 120. The other end of the first cable 230 penetrates through the first through hole 204 of the casing 200. A predetermined number of first transmission optical fibers 231 are connected to the first end 211 of the first optical waveguide 210, with the remaining first transmission optical fibers 231 are connected to the first end 221 of the second optical waveguide 220.

The second cable 240 may also include one or more second transmission optical fibers 241. One end of the second cable 240 penetrates through the second through hole 205 of the casing 200, and a predetermined number of second transmission optical fibers 241 are connected to the second end 212 of the first optical waveguide 210, and the remaining second transmission optical fibers 241 are connected to the second end 222 of the second optical waveguide 220. The other end of the second cable 240 is configured to be coupled to another optical communication module (not shown in figures).

In an example, the casing pipe 250 is a heat-shrink tube used for sheathing the casing 200 as well as parts of the first cable 230 and the second cable 240 respectively connected to two opposite sides of the casing 200 to shield the casing 200, the first cable 230 and the second cable 240 so as to provide insulation, anti-corrosion and anti-flaming. The present disclosure is not limited to the feature of the casing pipe 250 shown in the embodiment. In other embodiments, the cable assembly does not include the casing pipe.

As shown in FIG. 3, in this embodiment, the first optical waveguide 210 is capable of converging four first optical signals, outputted from four of first transmission optical fibers 231, into a second optical signal, wherein each of the four first optical signals have a respective wavelengths and these wavelengths are different from one another. The second optical signal includes a plurality of wavelengths different from one another. Further, the first optical waveguide 210 transmits the second optical signal from the second end 212 of the first optical waveguide 210 to one of the second transmission optical fibers 241. Similarly, the second optical waveguide 220 is capable of converging four first optical signals, inputted from the other four of the first transmission optical fibers 231, into anther second optical signal. Each of the four first optical signals could be associated with its corresponding wavelength and the wavelengths of the first optical signals are different from one another. Such second optical signal includes a plurality of wavelengths different from one another. Further, such second optical signal may be transmitted to the other second transmission optical fiber 241 through the second end 222 of the second optical waveguide 220.

In this embodiment, the number of the optical waveguides is two, but the protective scope of the present disclosure is not limited to this embodiment. In other words, the number of the optical waveguides may vary from case to case.

Figure 4:
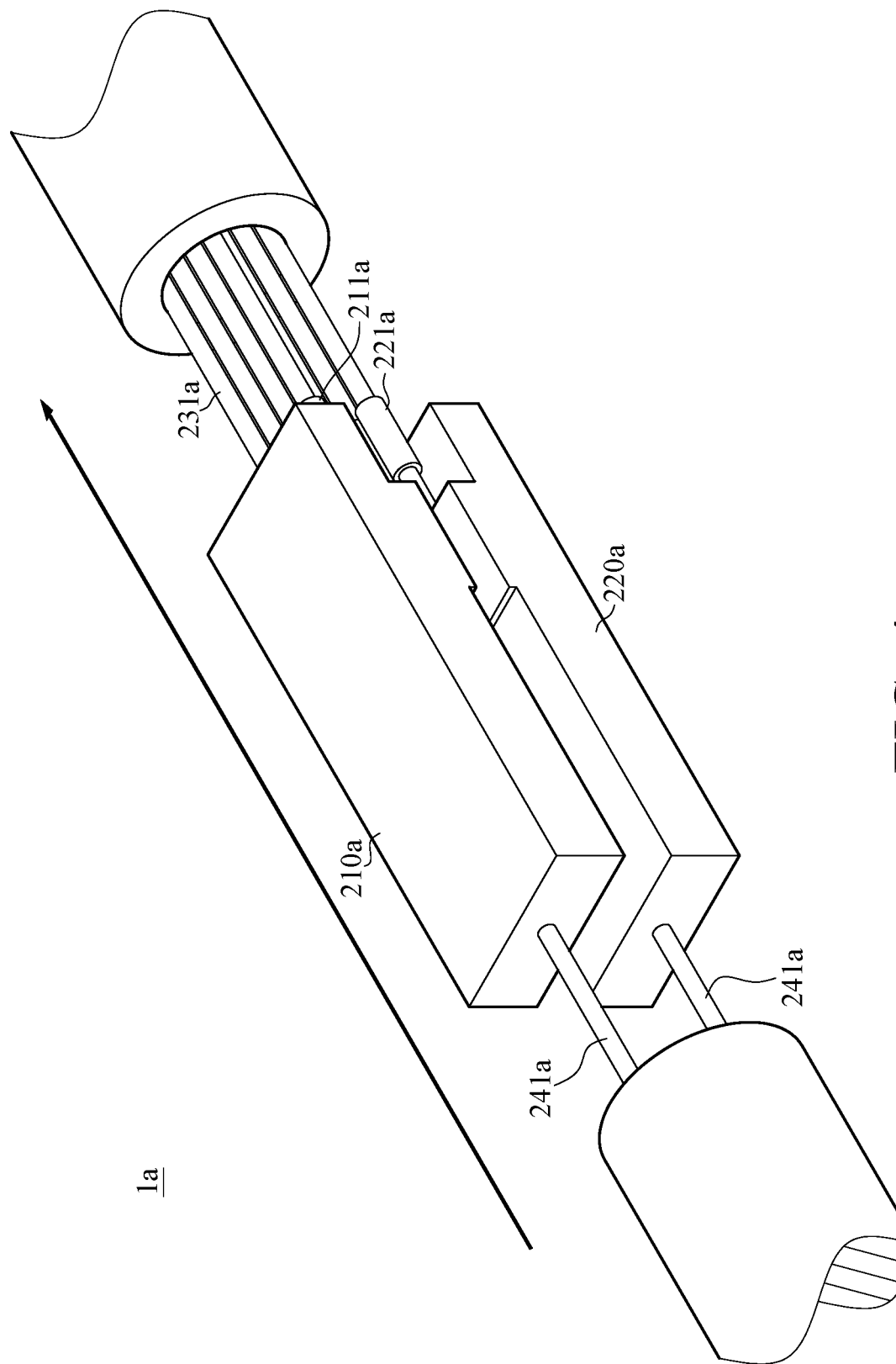
FIG. 4 is a diagram showing a direction in which an optical waveguide transmits optical signals according to another embodiment.

In the embodiment, the optical signals are transmitted in the direction from the optical communication connector 10 to the second cable 240 through the first cable 230, the first optical waveguide 210 and the second optical waveguide 220, so that the optical signals is delivered to the optical communication module (not shown in figures) coupled to the other end of the second cable 240, but the present disclosure is not limited as the result. Please refer to FIG. 4, which is a diagram showing a direction in which an optical waveguide transmits optical signals according to another embodiment. The wired optical communication assembly 1a shown in the embodiment is similar to the wired optical communication assembly 1 shown in the aforementioned embodiment. The difference between these embodiments could be the direction of the optical signal transmission. In this embodiment, and the first optical waveguide 210a and the second optical waveguide 220a are configured to convert an optical signal, including wavelengths different from one another, into a plurality of optical signals each has a respective wavelength, with those wavelengths different from one another.

Specifically, the first optical waveguide 210a is capable of converting a third optical signal, outputted from one of the second transmission optical fibers 241a, into four fourth optical signals, wherein the third optical signal includes wavelengths different from one another. Each of the four fourth optical signals has a respective wavelength, and those wavelengths are different from one another. Further, the first optical waveguide 210a transmits the four fourth optical signals from the first end 211a of the first optical waveguide 210a to four of the first transmission optical fibers 231a. Similarly, the second optical waveguide 220a is capable of converting a third optical signal, outputted from the other the second transmission optical fibers 241a, into four fourth optical signals, wherein the third optical signal includes wavelengths different from one another. Each of the four fourth optical signals has a respective wavelength, and those wavelengths are different from one another. Further, the second optical waveguide 220a transmits the four fourth optical signals from the first end 221a of the second optical waveguide 220a to the remaining four first transmission optical fibers 231a.

In the aforementioned embodiment, the optical waveguides are configured to converge a plurality of optical signals, having wavelengths different from one another, into an optical signal having wavelengths different from one another, or to convert an optical signal, having wavelengths different from one another, into a plurality of optical signals having wavelengths different from one another. In the aforementioned example, the number of the plurality of optical signals is four, but the present disclosure is not limited to that number. In other embodiments, the number of the plurality of optical signals is six or eight.

Moreover, in the aforementioned embodiment, the directions in which the two optical waveguides included in the cable assembly transmit optical signals are the same. In one example, each of the two optical waveguides converges a plurality of optical signals, inputted from the first cable, into a single optical signal and transmits the single optical signal to the second cable. In another example, each of the two optical waveguides converts a single optical signal, inputted from the second cable, into a plurality of optical signals and transmits the plurality of optical signals to the first cable. However, in other embodiments, the cable assembly has a first optical waveguide and a second optical waveguide, wherein the first optical waveguide is capable of converging a plurality of optical signals, outputted from the first cable, into a single optical signal and transmitting the single optical signal to the second cable, and the second optical waveguide is capable of converting a single optical signal, outputted from the second cable, into a plurality of optical signals and transmitting the plurality of optical signals to the first cable.

According to the wired optical communication assembly shown in the aforementioned embodiments, several advantages are provided by disposing the optical waveguides in the cable assembly instead of in the housing of the optical communication sub-assembly. One advantage of the present disclosure is that more space could be reserved for other electrical components such as a cooling device so as to achieve the purposes of an efficient space usage and performance optimization of optical communication elements. Another advantage of the present disclosure is that with the extra space part of the optical fibers may no longer need to be bent so as to maintain the transmission power of the optical signals and improve the efficiency of product assembly. Moreover, the possibility of optical fiber breakages due to the routing of the bent optical fibers could be minimized and therefore the corresponding manufacturing cost could be properly controlled.

What is claimed is:

1. An optical cable assembly, the optical cable assembly comprising:
    a casing that defines a storage space, the casing having a first through hole at a first end and a second through hole at the second end;
    a first arrayed waveguide grating (AWG) disposed in the storage space;
    a second AWG disposed in the storage space;
    a first optical cable comprising at least one transmission optical fiber connected to a first end of the first and second AWGs;
    a second optical cable comprising at least one transmission optical fiber connected to a second end of the first and second AWGs;
    wherein each of the first and second AWGs are disposed on different substrates and the first and second AWGs are disposed substantially parallel with each other and substantially parallel with a longitudinal axis of the casing such that each of the first and second AWGs have a first end proximate the first through hole and a second end proximate the second through hole.

2. The optical cable assembly of claim 1, wherein the first optical cable comprises a first plurality of transmission optical fibers coupled to the first end of the first AWG, and a second plurality of transmission optical fibers coupled to the first end of the second AWG, and wherein the first and second AWGs are configured to converge optical signals received from the first and second plurality of transmission optical fibers into first and second converged optical signals, respectively, and output the first and second converged optical signals via the second optical cable.

3. The optical cable assembly of claim 1, wherein the first and second AWGs are configured to receive first and second pluralities of optical signals from the first optical cable, wherein the first AWG separates each optical signal from the first plurality of optical signals to output a first plurality of separated optical signals via transmission optical fibers of the second optical cable connected to the first AWG, and wherein the second AWG separates each optical signal from the second plurality of optical signals to output a second plurality of separated optical signals via transmission optical fibers of the second optical cable connected to the second AWG.

4. The optical cable assembly of claim 1, wherein the casing is defined by a substantially cylindrical shape.

5. The optical cable assembly of claim 1, further comprising a casing pipe, the casing pipe to receive at least a portion of the casing.

6. The optical cable assembly of claim 1, wherein the first and second AWGs are configured to converge optical signals received from the first and second plurality of transmission optical fibers into a single optical signal, and output the single optical signal via the second optical cable.

* * * * *